United States Patent
Choi et al.

(10) Patent No.: US 11,232,512 B2
(45) Date of Patent: *Jan. 25, 2022

(54) METHOD AND DEVICE FOR COMBINING AN AVATAR IMAGE WITH A PORTION OF A USER'S IMAGE

(71) Applicant: SAMSUNG ELECTRONICS CO., LTD., Suwon-si (KR)

(72) Inventors: Sun Choi, Yongin-si (KR); Sun-hwa Kim, Seoul (KR); Jae-young Lee, Hwaseong-si (KR); Gi-ppeum Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,424

(22) Filed: Feb. 5, 2020

(65) Prior Publication Data

US 2020/0175581 A1 Jun. 4, 2020

Related U.S. Application Data

(63) Continuation of application No. 15/475,352, filed on Mar. 31, 2017, now Pat. No. 10,586,276.

(30) Foreign Application Priority Data

Mar. 31, 2016 (KR) .......................... 10-2016-0039092

(51) Int. Cl.
*G06T 19/00* (2011.01)
*G06Q 30/06* (2012.01)
(Continued)

(52) U.S. Cl.
CPC ......... *G06Q 30/0643* (2013.01); *G06F 3/002* (2013.01); *G06T 11/00* (2013.01);
(Continued)

(58) Field of Classification Search
None
See application file for complete search history.

(56) References Cited

U.S. PATENT DOCUMENTS

2003/0110099 A1* 6/2003 Trajkovic ........... G06Q 30/0601 705/26.1
2011/0064388 A1 3/2011 Brown et al.
(Continued)

FOREIGN PATENT DOCUMENTS

| CN | 102298797 A | 12/2011 |
| CN | 102509349 A | 6/2012 |

(Continued)

OTHER PUBLICATIONS

International Search Report, issued by International Searching Authority in corresponding International Application No. PCT/KR2017/003460, dated Jul. 18, 2017, (PCT/ISA/210).

(Continued)

*Primary Examiner* — Steven Z Elbinger
(74) *Attorney, Agent, or Firm* — Sughrue Mion, PLLC

(57) ABSTRACT

A method and an electronic device for composing an image are provided. An electronic device includes a display configured to display an image of a user photographed by a camera; an input component configured to receive a user input; a communicator configured to facilitate a communication with an external server; and a processor configured to display the image of the user on the display, set an avatar region within the image of the user based on the received user input, generate an avatar to be displayed on the avatar region, and control the display to combine the avatar with the image of the user and to display the resulting composite image.

20 Claims, 12 Drawing Sheets

(51) Int. Cl.
  *G06T 11/00* (2006.01)
  *G06F 3/00* (2006.01)
  *G06T 13/40* (2011.01)
  *G06T 15/04* (2011.01)
(52) U.S. Cl.
  CPC .............. *G06T 13/40* (2013.01); *G06T 15/04* (2013.01); *G06T 19/006* (2013.01); *G06T 2210/16* (2013.01)

(56) References Cited

U.S. PATENT DOCUMENTS

| | | | |
|---|---|---|---|
| 2012/0218423 A1 | 8/2012 | Smith et al. | |
| 2013/0113828 A1* | 5/2013 | Miyazaki | G06Q 30/0643 345/633 |
| 2013/0246227 A1 | 9/2013 | Du et al. | |
| 2014/0032359 A1 | 1/2014 | Dewangan | |
| 2014/0168217 A1* | 6/2014 | Kim | G06Q 30/0643 345/420 |
| 2014/0176565 A1 | 6/2014 | Adeyoola et al. | |
| 2015/0019390 A1 | 1/2015 | Vock | |
| 2015/0015691 A1 | 6/2015 | Curry et al. | |
| 2015/0154691 A1 | 6/2015 | Curry et al. | |
| 2015/0279098 A1 | 10/2015 | Kim et al. | |
| 2016/0042443 A1 | 2/2016 | Osada et al. | |
| 2016/0063588 A1 | 3/2016 | Gadre et al. | |
| 2016/0189431 A1* | 6/2016 | Ueda | G06Q 30/0643 705/26.8 |
| 2016/0196662 A1 | 7/2016 | Zhao | |
| 2017/0069124 A1* | 3/2017 | Tong | G06F 16/5854 |
| 2017/0148089 A1* | 5/2017 | Murzin | G06K 9/00362 |

FOREIGN PATENT DOCUMENTS

| | | |
|---|---|---|
| CN | 102982581 A | 3/2013 |
| CN | 103310342 A | 9/2013 |
| CN | 103489107 A | 1/2014 |
| CN | 103597519 A | 2/2014 |
| CN | 103714466 A | 4/2014 |
| JP | 5-336445 A | 12/1993 |
| KR | 10-2010-0048733 A | 5/2010 |
| KR | 10-2011-0013810 A | 2/2011 |
| KR | 10-1140533 B1 | 5/2012 |
| KR | 1020130026380 A | 3/2013 |
| KR | 1020140077820 A | 6/2014 |
| KR | 10-2014-0108128 A | 9/2014 |
| KR | 10-2015-0029798 A | 3/2015 |
| KR | 1020150113309 A | 10/2015 |
| WO | 2008/108760 A1 | 9/2008 |
| WO | 2012110828 A1 | 8/2012 |

OTHER PUBLICATIONS

Written Opinion, issued by International Searching Authority in corresponding International Application No. PCT/KR2017/003460, dated Jul. 18, 2017, (PCT/ISA/237).
Communication dated Apr. 7, 2020 from the State Intellectual Property Office of the P.R.China in application No. 201780020971.4.
Communication dated Mar. 19, 2020 from the Korean Patent Office in application No. 10-2016-0039092.
Communication dated Oct. 12, 2020, issued by the State Intellectual Property Office of P.R. China in counterpart Chinese Application No. 201780020971.4.
Communication dated Oct. 29, 2020, issued by the Korean Patent Office in counterpart Korean Application No. 10-2016-0039092.
Communication dated Mar. 4, 2021 by the State Intellectual Property Office of P.R. China in counterpart Chinese Patent Application No. 201780020971.4.

* cited by examiner

METHOD AND DEVICE FOR COMBINING AN AVATAR IMAGE WITH A PORTION OF A USER'S IMAGE

CROSS-REFERENCE TO RELATED APPLICATIONS

This application is a continuation of U.S. application Ser. No. 15/475,352 filed on Mar. 31, 2017, which claims priority from Korean Patent Application No. 10-2016-0039092, filed on Mar. 31, 2016, in the Korean Intellectual Property Office, the disclosure of which is incorporated herein by reference in its entirety.

BACKGROUND

Technical Field

Apparatuses and methods according to one or more exemplary embodiments relate to a method for composing an image and an electronic device thereof, and more particularly, to an electronic device that composes images to virtually provide a fitting service.

Description of the Related Art

In accordance with the development of electronic technology, various types of electronic products have been developed and distributed, and electronic devices having a variety of functions that relate to providing information are used. Further, the electronic products which have previously been conventionally used only indoors have been installed on the streets and used.

Among these electronic products, a large format display (LFD) device is a commercial large display which is installed and operated for the purpose of publicity and information transfer, and the LFD device may be classified into a standalone device configured by one panel and a video wall in which several panels are connected to each other. In addition, the LFD device may be installed in a lobby of a company for the purpose of brand and company publicity, or may be used for any of various purposes, such as an interior of a store, a menu board, etc. A service for virtually wearing clothes by using the LFD device has recently been provided. When a user purchases clothing or an accessory by using the method as described above, the user may determine whether to purchase the products by looking at the products worn by others, such as an avatar or a model displayed on the LFD device. In this case, there may be an inconvenience that arises because the user does not actually wear the clothing and the accessory, which results in unpredictable results. In addition, various problems may occur that when the season and surroundings are changed, the purchased clothing and the accessory are not matched with the user.

SUMMARY

Exemplary embodiments described in the present disclosure overcome the above disadvantages and other disadvantages not described above. Also, the present disclosure is not required to overcome the disadvantages described above, and an exemplary embodiment of the present disclosure may not overcome any of the problems described above.

At least one exemplary embodiment provides a natural image as if a user actually wears clothes, by obtaining body information that relates to the user from an image of the user photographed by a camera, and composing and displaying an avatar generated based on the body information with the image of the user.

According to an aspect of one or more exemplary embodiments, a method for composing an image by using an electronic device includes displaying an image of a user photographed by a camera; setting an avatar region with respect to the image of the user based on a user input; generating an avatar to be displayed on the avatar region; and combining the avatar with the image of the user and displaying the resulting composite image.

According to another aspect of one or more exemplary embodiments, an electronic device includes a display configured to display an image of a user photographed by a camera; an input component configured to receive a user input; a communicator configured to facilitate a communication with an external server, and a processor configured to display the image of the user on the display, set an avatar region with respect to the image of the user based on the received user input, generate an avatar to be displayed on the avatar region, and control the display to combine the avatar with the image of the user and to display the resulting composite image.

According to the diverse exemplary embodiments of the present disclosure, the electronic device may show a figure as if the user actually wears the clothes by classifying the display into an avatar region on which the avatar is displayed and a mirror region on which an actual figure of the user is displayed, and combining and displaying the avatar and the image of the user photographed by the camera, whereby it is possible to provide a natural fitting service that is realistic and is well suited to the user.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
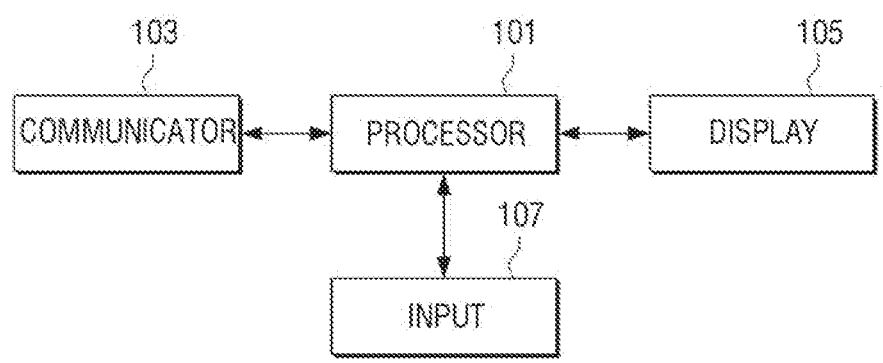
FIG. 1 illustrates a block diagram of an electronic device, according to one or more exemplary embodiments.

Hereinafter, diverse exemplary embodiments of the present disclosure will be described with reference to the accompanying drawings. However, it is to be understood that technologies mentioned in the present disclosure are not limited to specific exemplary embodiments, but include all modifications, equivalents, and substitutions according to exemplary embodiments of the present disclosure. Throughout the accompanying drawings, similar components will be denoted by similar reference numerals.

In the present disclosure, an expression such as "have", "may have", "include", "may include", or the like, indicates the existence of a corresponding feature (for example, a numerical value, a function, an operation, a component such as a part, or the like), and does not exclude the existence of an additional feature.

In the present disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

Expressions such as "first", "second", or the like, as used in the present disclosure, may indicate various components without regard to a sequence and/or importance of the components, will be used only in order to distinguish one component from the other components, and do not limit the corresponding components. For example, a first user device and a second user device may indicate different user devices without regard to a sequence or importance thereof. For example, a first component may be named a second component and the second component may also be similarly named the first component, without departing from the scope of the present disclosure.

When it is mentioned that any component (for example, a first component) is (operatively or communicatively) coupled with/to or is connected to another component (for example, a second component), it is to be understood that any component may be directly coupled to another component, or may be coupled to another component via the other component (for example, a third component). Conversely, when it is mentioned that any component (for example, a first component) is "directly coupled" or "directly connected" to another component (for example, a second component), it is to be understood that the other component (for example, a third component) is not present between any component and another component.

An expression "configured (or set) to" as used in the present disclosure may be replaced by an expression such as "suitable for", "having the capacity to" "designed to", "adapted to", "made to", or "capable of," depending on a particular situation. A term "configured (or set) to" may not necessarily mean "specifically designed to" in hardware. Instead, an expression "an apparatus configured to" may mean that the apparatus may operate together with other apparatuses or components. For example, a "processor configured (or set) to perform A, B, and C" may mean a dedicated processor (for example, an embedded processor) for performing the corresponding operations, or a general-purpose processor (for example, a central processing unit (CPU) or an application processor (AP)) that may perform the corresponding operations by executing one or more software programs stored in a memory apparatus.

Terms used in the present disclosure may be used only in order to describe specific exemplary embodiments rather than restricting the scope of other exemplary embodiments. Singular forms may include plural forms unless the context clearly indicates otherwise. Terms used in the present specification, including technical and scientific terms, have the same meanings as those that are generally understood by persons having ordinary skill in the art to which the present disclosure pertains. Terms defined by a general dictionary among terms used in the present disclosure may be interpreted as meanings that are the same as or similar to meanings within a context of the related art, and are not interpreted as ideal or excessively formal means unless clearly defined in the present disclosure. In some cases, terms may not be interpreted to exclude exemplary embodiments of the present disclosure even though they are defined in the present disclosure.

An electronic device according to diverse exemplary embodiments of the present disclosure may include, for example, at least one from among a large flat display (LFD), a smartphone, a tablet personal computer (PC), a desktop personal computer (PC), and a television. The electronic device according to an exemplary embodiment of the present disclosure is not limited to the above-mentioned devices, and may include a new electronic device according to a technology development.

Hereinafter, an electronic device according to diverse exemplary embodiments of the present disclosure will be described with the accompanying drawings. In the present disclosure, a term "user" may refer to a person that uses the electronic device or a device (e.g., an artificial intelligence electronic device) that uses the electronic device.

FIG. 1 illustrates a block diagram of an electronic device, according to diverse exemplary embodiments.

Referring to FIG. 1, an electronic device may include a display 105, an input (also referred to herein as "an input device" and/or as an "input component") 107, a communicator 103, and a processor 101.

The display 105 may include, for example, any of a liquid crystal display (LCD), a light-emitting diode (LED) display, an organic light-emitting diode (OLED) display, a micro-electromechanical systems (MEMS) display, or an electronic paper display. The display 105 may display, for example, any of a variety of contents (e.g., a text, an image, a video, an icon, a symbol, or the like) to the user. In particular, the display 105 may display an avatar generated based on an image of the user photographed by a camera and body information that relates to the user. The term "avatar" refers to a graphic image that is composed similarly to a figure of the user, and the two terms may be used interchangeably throughout the present disclosure.

The display 105 may include a touch screen, and may receive a user input. For example, the display 105 may receive a touch, a gesture, proximity, or a hovering input via the use of an electronic pen or stylus or a portion of the body of the user.

The display 105 may display the image of the user photographed by the camera. The display 105 may display the image together with the avatar.

The input 107 may include, for example, any of a touch panel, a (digital) pen sensor, a key, or an ultrasonic input device. The touch panel may use, for example, at least one type from among a capacitive type, a resistive type, an infrared type, or an ultrasonic type. In addition, the touch panel may further include a control circuit. The touch panel may further include a tactile layer to provide a tactile reaction to the user.

The (digital) pen sensor may include, for example, a portion of the touch panel, or may include a separate recognition sheet. The key may include, for example, any of a physical button, an optical key, or a keypad. The ultrasonic input device may sense an ultrasonic wave generated from an input tool via a microphone (e.g., a microphone 288) to confirm data that corresponds to the sensed ultrasonic wave.

The input 107 may include a motion sensor. The motion sensor may sense a motion of the user, and may output an electrical signal in response to the motion of the user. For example, the motion sensor may recognize a hand gesture of the user and output an electrical signal that corresponds to the recognized hand gesture. The electronic device may perform a corresponding instruction based on the electrical signal.

The communicator 103 may perform, for example, communication between the electronic device and an external device, or between the electronic device and a server. For example, the communicator 103 may be connected to a network via wireless communication or wired communication in order to communicate with the external device or the server.

The wireless communication may use, for example, a cellular communication protocol, such as, for example, at least one of long-term evolution (LTE), LTE advance (LTE-A), code division multiple access (CDMA), wide CDMA (WCDMA), universal mobile telecommunications system (UMTS), wireless broadband (WiBro), and/or global system for mobile communications (GSM). In addition, the wireless communication may include, for example, local area communication. The local area communication may include, for example, at least one of wireless fidelity (WiFi), Bluetooth, and near field communication (NFC).

The wired communication may include, for example, at least one of an universal serial bus (USB), a high definition multimedia interface (HDMI), recommended standard 232 (RS-232), and/or a plain old telephone service (POTS).

The processor 101 may include one or more of a central processing unit (CPU), an application processor (AP), and/or a communication processor (CP).

The processor 101 may execute, for example, an operation or a data processing function related to a control of and/or communication with one or more other components of the electronic device In particular, the processor 101 may set some regions of the image of the user to an avatar region based on the user input in a state in which the image of the user is displayed on the display 105, and may generate an avatar to be displayed on the avatar region. The processor 101 may control the display 105 to combine the generated avatar with the image of the user and to display the resulting composite image. The processor 101 may obtain information that relates to at least one item of clothing worn by the user in the avatar region, and obtain at least one item of clothing to be worn by the avatar from the server based on the information relating to the clothing. Here, the clothing may refer to a clothing image that is displayed together with the avatar. The information relating to the clothing may include a category of the clothing and color information relating to the clothing. For example, the category of the clothing may include at least one from among a top, a bottom, a skirt, pants, a shirt, casual clothing, and a suit. The color information may refer to a color of the clothing. A figure of the avatar may vary based on the motion of the user. For example, when the user twists his/her body, the avatar may also be changed to a twisted figure. When the user lifts his/her hand, the avatar may also be changed to a figure in which the avatar lifts his/her hand.

The processor 101 may identify a skin color of the user adjacent to and/or around the avatar region, and may generate the avatar based on the identified skin color.

The processor 101 may control the display 105 so that the clothes to be worn by the avatar are changed based on the user input. 'Clothes to be worn by the avatar' or 'clothes to wear on the avatar' refers to a graphic image in which the avatar and the clothing image are combined, and may be used interchangeably in the present disclosure.

The processor 101 may determine the clothes to be worn by the avatar based on the user input, and control the display 105 to combine the avatar wearing the clothes with the image of the user and display the resulting composite image.

The processor 101 may obtain coordination information that relates to the clothing based on the determined clothes, determine a second item of clothing that corresponds to the determined clothes based on the obtained coordination information, and control the display 105 to combine an avatar wearing the second clothing with the image of the user and display the resulting composite image. Here, the second item of clothing may include at least one of clothes, shoes, and accessories.

According to an exemplary embodiment, the electronic device may include a camera (not shown). The camera, which is a device that is capable of photographing a still image and/or a moving image, may include one or more image sensors (e.g., a front sensor or a rear sensor), a lens, an image signal processor (ISP), or a flash (e.g., an LED or a xenon lamp), according to an exemplary embodiment.

In addition, the camera may be provided as a separate device, and may be functionally connected to the electronic device to transmit the photographed screen to the electronic device.

Figure 2:
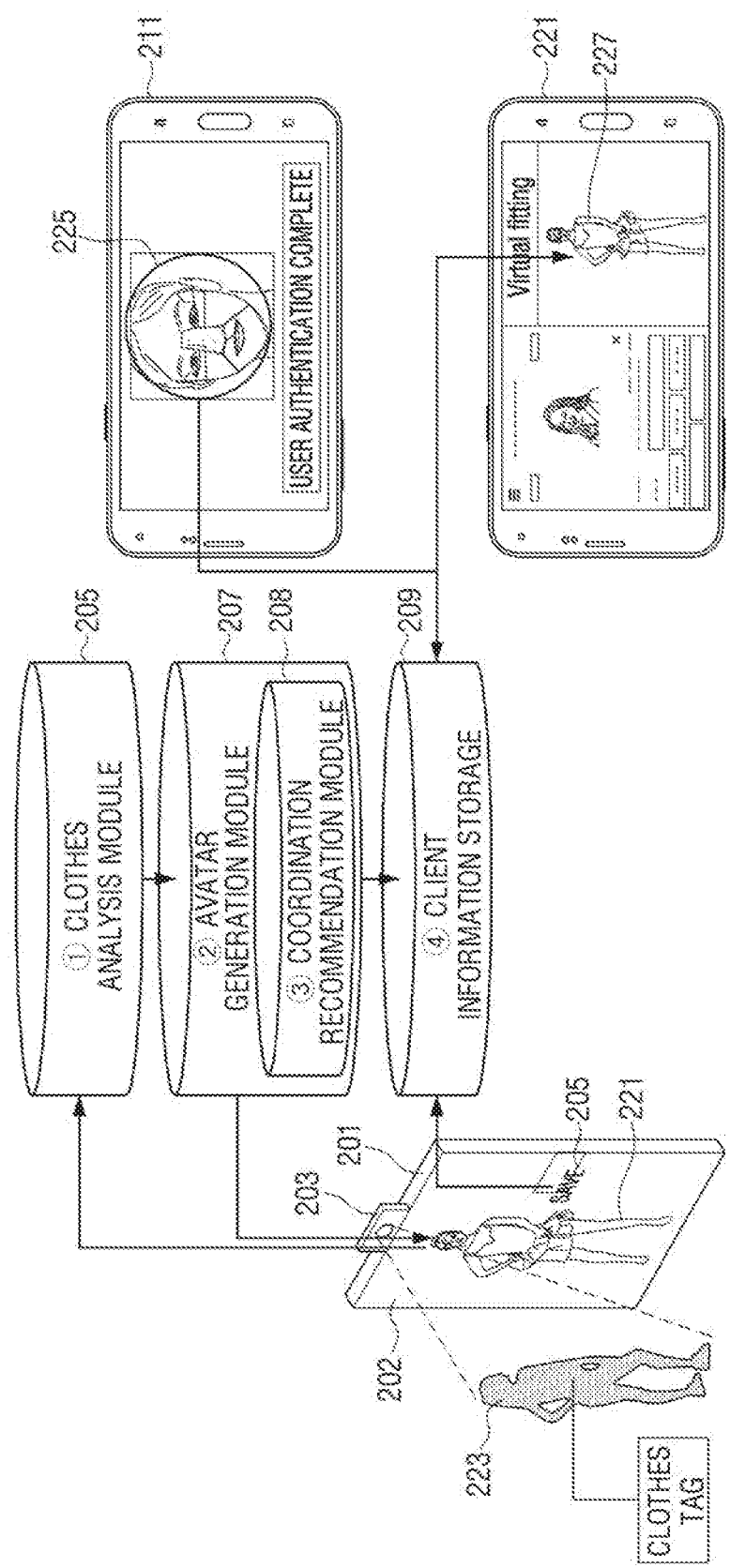
FIG. 2 illustrates a process of providing a virtual clothes-wearing service in the electronic device, according to an exemplary embodiment.

FIG. 2 illustrates a process of providing a virtual clothes wearing service in the electronic device, according to an exemplary embodiment. The term "virtual clothes" may be the same as a "clothes image."

Referring to FIG. 2, an electronic device 201, a display 202, a camera 203, a clothes analysis module 205, an avatar generation module 207, a coordination recommendation module 208, and a client information storage 209 are illustrated.

The electronic device 201 may include the display 202, and the display 202 may display the image of the user photographed by the camera 203. The display 202 may include a touch panel. The display 202 may receive a touch input from the user. The display 202 may have a size that is sufficient to display an entire body image of the user, and for example, a large flat display (LFD) may be used.

The camera 203 may be built in the electronic device 201 or provided in a separate accessory form, and may be functionally connected to the electronic device 201. The camera 203 may photograph the user and may generate the image of the user. The electronic device 201 may recognize a hand gesture or a motion of the user utilizing the image of the user photographed by the camera 203, and may perform an instruction that corresponds to the recognized hand gesture or motion. For example, when the user stands in the front of the electronic device 201 and performs an operation of shaking a hand, the electronic device 201 may store a screen which is currently displayed on the display 202, in response to the above-mentioned operation. When the user moves the hand from left to right in the front of the electronic device 201, the electronic device 201 may change the clothing worn by the avatar to another item of clothing in response to the movement of the hand. The motion recognition of the user may be implemented by utilizing a separate motion sensor (not shown). According to an exemplary embodiment, the camera 203 may include a depth camera for measuring a depth value of the photographed image. The electronic device 201 may measure a face and a body index of the user from the depth value of the photographed image. In particular, the electronic device 201 may analyze the photographed image to extract face feature elements of the user which may be utilized at the time of providing a fitting service. For example, the electronic device 201 may analyze the photographed image to extract information that relates to any one or more of facial figures (an egg shape, an inverted triangular shape, etc.), skin colors (yellow tone, white tone, etc.), hair colors (black, brown, blonde, etc.), hair styles (long hair, short hair, short, permed hair, etc.), pupil colors (black, brown, blue, gray, etc.), eye shapes (double eyelid, single eyelid, etc.), a size of an eye, and lip colors (red, green, etc.).

In addition, the electronic device 201 may analyze the photographed image to extract body elements which are usable for determining fitting suitability of a product to be recommended. For example, the electronic device may extract information on sizes of a body length (an arm length, a leg length, a chest width, a shoulder width, a thigh girth, a neck girth, etc.) and a proportional index for each of the portions of the body length (the body length to the arm or leg length—e.g., a well proportioned figure, etc.) from the photographed image.

In addition, the electronic device 201 may extract a body length and a ratio of each main body element which may be predicted based on the photographed image and the sensor, and information on numerical values thereof.

In addition, the electronic device 201 may recognize a three-dimensional (3D) motion by utilizing the depth camera.

The electronic device 201 may include the clothes analysis module 205, the avatar generation module 207, and the coordination recommendation module 208. The clothes analysis module 205, the avatar generation module 207, and the coordination recommendation module 208 may be stored in a form of an instruction code in the storage (not shown), and may be loaded into the processor 101 when a program is executed to perform the corresponding function.

The clothes analysis module 205 may analyze the image of the user photographed by the camera 203, extract a portion that corresponds to the clothes from the image of the user, and obtain information that relates to the clothes worn by the user. The information on the clothes may include a category and color information of the clothes. The category information of the clothes may include, for example, one or more of top, bottom, pants, and skirt.

In addition, the clothes analysis module 205 may determine whether or not the clothes worn by the user are virtual clothes or actual clothes being sold in the store. For example, in the case in which a tag is attached to the clothes being sold in the store, when the tag for the clothes is identified from the image of the user, the clothes analysis module 205 may determine the corresponding clothes as being the actual clothes being sold in the store. A detailed description of the clothes analysis module 205 will be provided in detail below with reference to FIG. 3. The clothes analysis module 205 may also be implemented in the server.

The avatar generation module 207 may analyze the image of the user in order to measure a face of the user and a size or a feature of the body and to generate the avatar. The avatar may be generated based on the image of the user. The avatar may be generated as a figure that is similar to a figure of the user. In particular, the avatar generation module 207 may determine body information such as a height, a chest size, a waist size, a hip size, an arm length, a leg length, etc. based on the image of the user, and generate the avatar based on the determined body information.

A detailed description of the avatar generation module 207 will be provided in detail below with reference to FIG. 4. The avatar generation module 207 may also be implemented in the server.

The coordination recommendation module 208 may recommend a second item of clothing that is best matched with the clothes selected by the user. In particular, the coordination recommendation module 208 may determine the second item of clothing based on the clothes selected by the user The coordination recommendation module 208 maps the clothes selected from the corresponding brand loaded from the clothes analysis module 205 with preferences of accessories (shoes, bags, belts, etc.) registered in advance in association with the selected clothes, and provides the mapped result.

A detailed description of the coordination recommendation module 208 will be provided in detail below with reference to FIG. 5.

The client information storage 209 may be implemented in the server, and may store a variety of information that relates to the user. For example, when the user intends to log into an on-line shopping mall by using the electronic device 211, the electronic device 211 may photograph the face of the user by using an embedded camera and transmit a photographed face image 225 of the user to the server in order to retrieve information that relates to the user. When the information relating to the user is retrieved and the user is identified, the server may approve a log in operation performed by the user, and transmit the information relating to the user stored in the server to the electronic device 211. The electronic device 211 may output the received information relating to the user. The information relating to the user may include information that relates to the avatar of the user and the clothes which were previously purchased by the user. In this aspect, when the face of the user recognized by the camera 203 and the information relating to the face of the user stored in the client information storage 209 are compared with each other, if they are matched with each other, the electronic device 211 may call the avatar of the recognized user, and may display purchase history information 227 of the user on the display.

In an exemplary embodiment, at least one of the clothes analysis module 205, the avatar generation module 207, the coordination recommendation module 208, and the client information storage 209 may also be implemented in the server. In this case, the electronic device 211 may transmit the image of the user photographed by the camera 203 to the server via the communicator, and the server may transmit the result calculated by the clothes analysis module 205, the avatar generation module 207, and the coordination recommendation module 208 to the electronic device.

Figure 3:
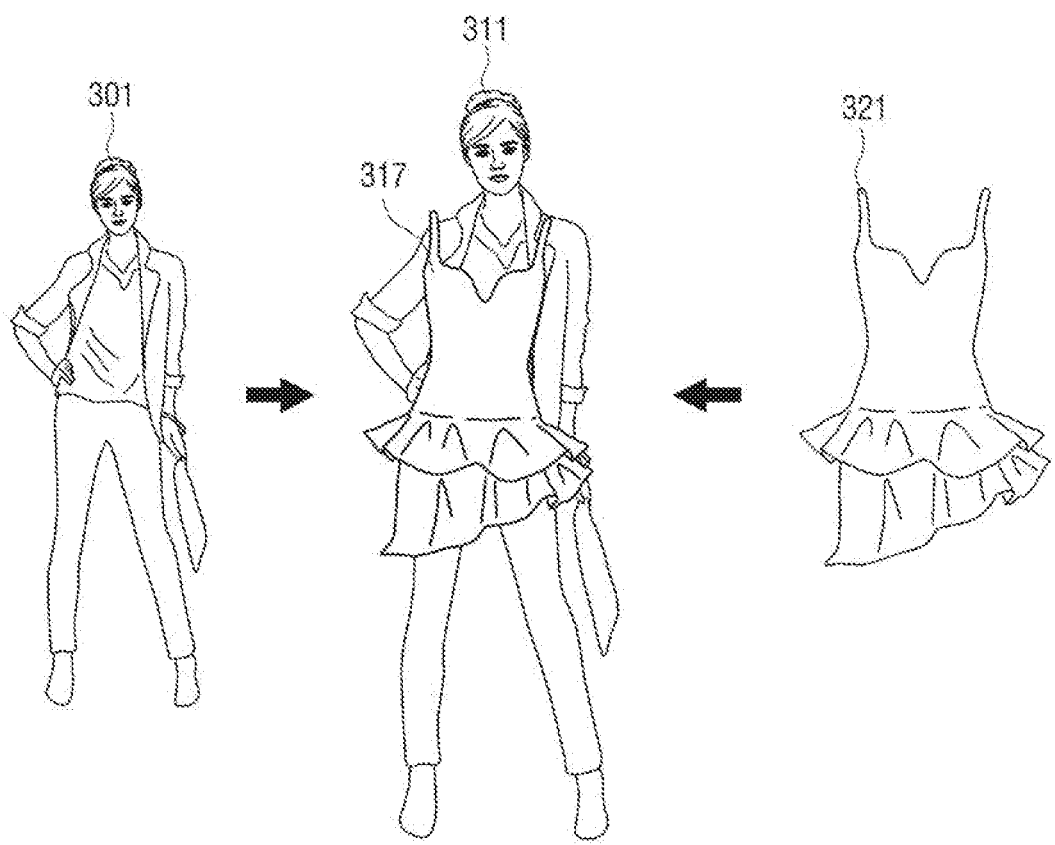
FIG. 3 illustrates an exemplary embodiment of a clothes analysis module.

FIG. 3 illustrates an exemplary embodiment of a clothes analysis module.

Referring to FIG. 3, an image 301 of the user photographed by the camera, a virtual item of clothing 321 selected on-line by the user, and a state 311 in which an image of the virtual clothing item selected by the user overlaps with the image of the user are illustrated.

The electronic device 201 may analyze the image 301 of the user photographed by the camera 203 in order to obtain information that relates to the clothes worn by the user. For example, the electronic device 201 may determine from the image 301 of the user whether the user wears which category of clothing from among outerwear, tops, bottoms, and accessories. In particular, the electronic device 201 may classify the category and color of the clothes worn by the user. For example, the electronic device 201 may determine that the outerwear worn by the user is a jacket and the color thereof is sky-blue, the top is a t-shirt and the color thereof is white, the bottom is a long pair of trousers and the color thereof is blue, and the accessory is a handbag and the color thereof is black.

If the user selects the virtual item of clothing, the electronic device 201 may analyze metadata that relates to the virtual clothing item 321. The metadata may include product classification information of clothing products (pants, shirts, skirts, etc.), a cut pattern layout of each product, and unique information of the product such as a color, a pattern, and a texture of the clothes and a texture (matte, reflected light, etc.) of fabric. The metadata may be generated together when the corresponding product (clothing) is designed, and may be stored in the server.

For example, the electronic device 201 may identify the category of the virtual clothing item selected by the user as one-piece, and a color thereof as red. In this case, the electronic device 201 may select one virtual clothing item with respect to the user, but it is merely one example, and may also select a plurality of virtual clothing items having a specific type with respect to the user.

In addition, the electronic device 201 may receive coordination information that relates to the clothes from the server. The coordination information may be product additional information in which the products (tops, bottoms, accessories, etc.) or the color matched with the selected clothing are packaged.

For example, the electronic device 201 may receive information such as sleeveless, solo wear, collarbone line, stockings, shoes, and accessories as the coordination information relating to the clothes from the server. The electronic device 201 may compose an image that is usable for checking a figure of an arm of a sleeveless state and the collarbone line in the image of the user by using the received coordination information. In addition, the electronic device 201 may compose an image in which the stockings are worn from the image of the user by using the coordination information.

As another example, in the case in which the user searches for and selects a top knit item of clothing, the electronic device may recommend a gray skirt, black stockings, and black shoes as the coordination information.

Therefore, the electronic device 201 may analyze the clothes which are currently worn by the user and the virtual clothes by using the method as described above.

Figure 4:
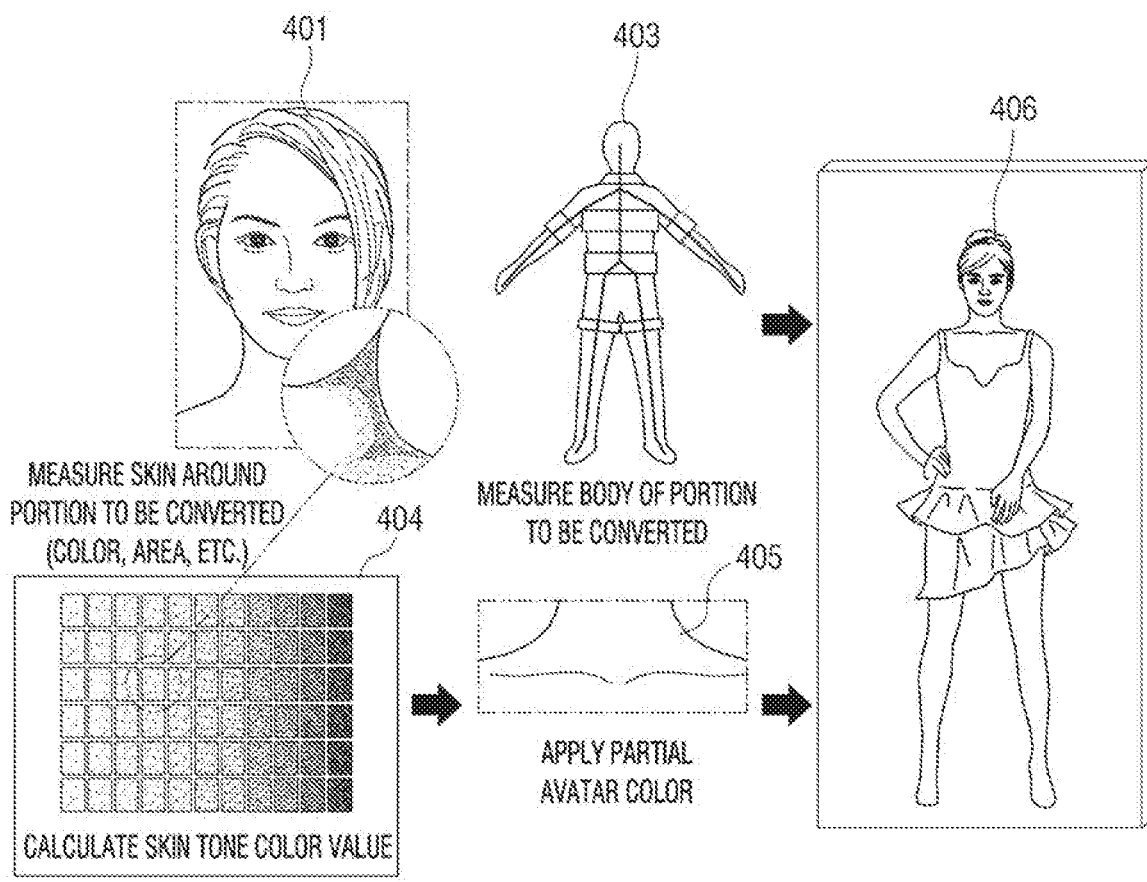
FIG. 4 illustrates an exemplary embodiment of an avatar generating module.

FIG. 4 illustrates an exemplary embodiment of an avatar generating module.

Referring to FIG. 4, an image 401 of the user, a color table 404, a body portion 403 of the user to be converted into the avatar, and a composite graphic image 406 in which the avatar is combined with the image of the user are illustrated.

The electronic device 201 may generate the avatar based on body information that relates to the user. The body information of the user may include a skin color of the user and body dimensions of the user. The electronic device may generate the avatar based on information such as the skin color determined for each of the body portions, a length and thickness of each respective body portion, etc. In this case, the length and thickness of each body portion may include values obtained by performing a prediction by the electronic device 201.

For example, the electronic device 201 may analyze the image 401 of the user to observe a skin area adjacent to and/or around a portion to be converted into the avatar, for example, a skin color and an area, and to calculate a color value of the skin color. The color value of the skin color may be obtained by comparing the skin color extracted from the image of the user with the color table 404 stored in the electronic device 201 or the server. If the color value of the skin color is determined, the electronic device 201 may apply a color that corresponds to the color value to the avatar in order to generate the avatar 406. In addition, the electronic device 201 may extract information 403 that relates to the body of the user from the image of the user. In particular, the electronic device 201 may extract body information of a portion to be converted into the avatar, and generate the avatar 406 based on the extracted body information. In this case, the avatar 406 may be generated in a state in which the avatar 406 wears the clothes selected by the user.

In this manner, the electronic device 201 may generate the avatar based on information relating to the clothes worn by the analyzed user, information relating to the virtual clothes, and information relating to the user.

Figure 5:
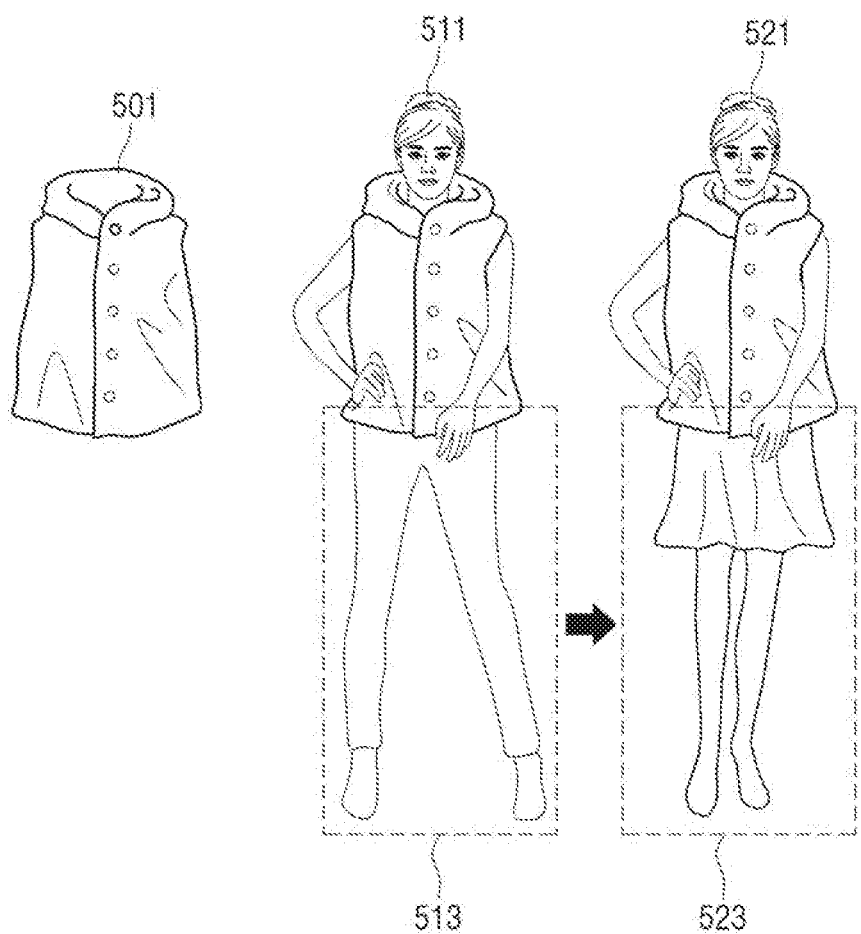
FIG. 5 illustrates an operation example of a coordination recommendation module.

FIG. 5 illustrates an operation example of a coordination recommendation module.

Referring to FIG. 5, when the user selects virtual clothes 501 on-line, the electronic device 201 may receive the coordination information on the virtual clothes based on the category and color information of the virtual clothes from the server. According to an exemplary embodiment, the coordination information may be stored in the electronic device 201.

When the user selects the virtual clothes on-line, the electronic device 201 may determine a category and color of the virtual clothes selected by the user. For example, when the user selects a red blouse on-line, the electronic device 201 may analyze metadata of the virtual clothes selected by the user to determine that the virtual clothing item selected by the user is a blouse, and the color thereof is red. The information on the category and color of the virtual clothes may be stored in the server or the electronic device 201. In addition, the metadata for the virtual clothes selected by the user may include the coordination information. The electronic device 201 may recommend one or more items of clothing which are well suited to the virtual clothes selected by the user based on the coordination information. For example, when the category of the virtual clothing item selected by the user is the top, the electronic device 201 may recommend a bottom based on the coordination information. When the category of the virtual clothing item selected by the user is the bottom, the electronic device 201 may recommend a top based on the coordination information The coordination information may include second clothing information which is matched to the virtual clothes. In particular, the second clothing information may include information that relates to at least one from among tops, bottoms, pants, skirts, shoes, or accessories. For example, when the user selects a blouse as the virtual item of clothing, the electronic device 201 may recommend any one or more from among a bottom, a skirt, stockings, and shoes which are matched to the blouse.

The electronic device 201 may extract information that relates to the clothes which are actually being worn by the user from the image of the user, compare the extracted information with the virtual clothing items that are recommended based on the coordination information, and combine the virtual clothes that are recommended based on the coordination information with the avatar when the clothes which are actually being worn by the user is different from the coordination information.

In particular, when the user selects the virtual clothes 501 on-line, the electronic device 201 may combine the selected virtual clothes 501 with the image of the user to generate a partial avatar image 511. The partial avatar image 511 may include the virtual clothes 501 selected on-line by the user and an image of the clothing which is originally worn by the user. The electronic device 201 may determine whether or not a clothing item 513 currently being worn by the user is different from the virtual clothes recommended based on the coordination information. As a result of the determination, when the clothes 513 being worn by the user is different from the virtual clothes that are recommended based on the coordination information, the electronic device 201 may change the clothes 513 worn by the user to a virtual item of clothing 523 that is recommended based on the coordination information, and may display the virtual item of clothing 523 on the display 202.

In an exemplary embodiment, when the user stands in the front of the LFD, the electronic device 201 photographs the user by using the camera 203 in order to generate the image of the user. When the user selects the virtual clothes 501 on-line, the electronic device 201 may display an avatar wearing the virtual clothes 501 on an upper body of the image of the user, and may display a state in which an original pair of jeans of the user is worn on a lower body thereof. The electronic device 201 may recommend a skirt 523 based on the coordination information of the virtual clothes 501 selected by the user, and may display the skirt 523 on the display 202.

In addition, the electronic device 201 may recommend clothing which is best matched to the user by using a clothes catalog image. The clothes catalog image includes information that relates to the most suitable clothing selected by a designer or a coordinator of the product at the time of initially designing the product, and is registered with the server. For example, when the user selects a sleeveless cardigan suit in the electronic device, the electronic device may combine the image of the pair of jeans which is currently being worn with a gray skirt which is best matched to the cardigan suit, and display the composite result on the display.

Figure 6:
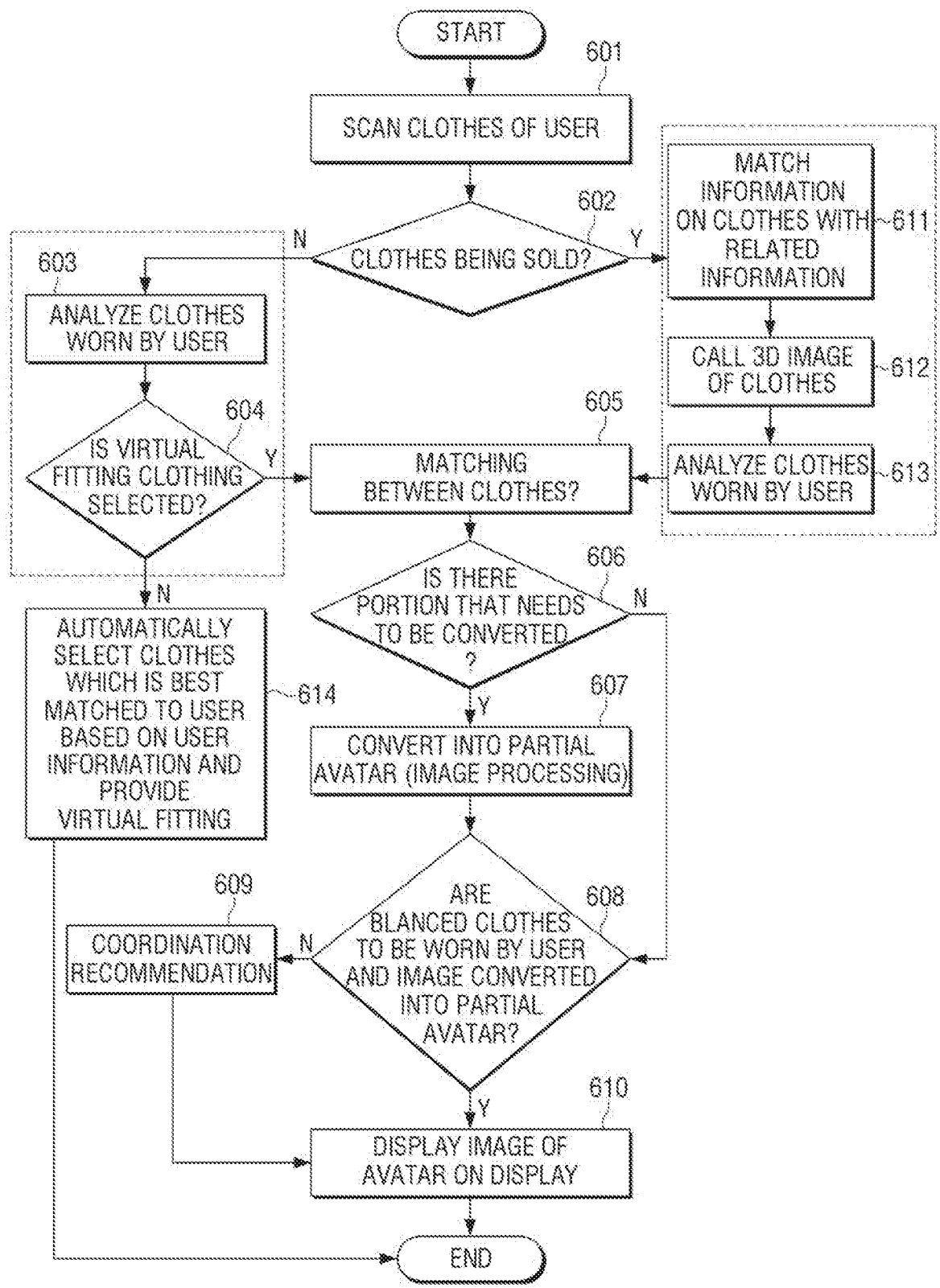
FIG. 6 is a flowchart of an operation of an electronic device, according to an exemplary embodiment.

FIG. 6 is a flowchart of an operation of an electronic device, according to an exemplary embodiment.

In operation 601, the electronic device 201 scans the clothes worn by the user. The electronic device 201 may scan the clothes worn by the user from the image of the user obtained by the camera 203. The electronic device 201 may scan the clothes of the user to identify the category and color of the clothes currently worn by the user. In particular, the electronic device 201 may scan and identify the clothes and/or the accessories worn by the user or selected by the user in the store, from a photographed image. Alternatively, the electronic device 201 may identify the clothes of the user by using a sensor, or the like tagged to the clothes.

For example, the electronic device 201 may identify that the clothes worn by the user include a blouse and the color thereof is red.

In operation 602, the electronic device 201 may determine whether or not the clothes worn by the user are the clothes being sold. For example, if a price tag is identified from the image of the clothes worn by the user, the electronic device 201 may determine the clothes worn by the user as the clothes being sold.

If the clothes worn by the user is determined as the clothes being sold (i.e., Yes in operation 602), the electronic device 201 may match information relating to the clothes worn by the user with related information (e.g., link information capable of loading three-dimensional (3D) image information from a database) obtained from a database (operation 611). The database may be stored in the server. In operation 612, the electronic device 201 obtains a 3D image of the clothes. In particular, the electronic device 201 may retrieve the 3D image of the clothes from the server by utilizing the metadata included in the information on the clothes. The electronic device 201 may combine the retrieved 3D image of the clothes with the avatar and the image of the user and display the composite result on the display 202. In operation 613, the electronic device 201 may analyze the clothes worn by the user. In particular, the electronic device 201 may analyze an image input to the camera to identify a region in which the 3D image obtained from the database may be overlapped or unbalanced at the time of matching with the clothes currently being worn by the user.

If it is determined that the clothes worn by the user is not the clothes being sold (i.e., No in operation 602), the electronic device 201 may analyze the clothes worn by the user (operation 603). Since operation 603 is the same operation as operation 613, a detailed description thereof will be omitted.

In operation 604, the electronic device 201 may determine whether or not the user selects a virtual fitting clothing item. Whether or not the user selects the virtual fitting clothing item may be determined by using a user input. For example, in the case in which the user selects a product to be virtually fitted by performing a motion or by touching the product in a state in which the product to be virtually fitted is displayed on the display, the electronic device 201 may determine that the user selects the virtual fitting clothing item.

If it is determined that the user does not select the virtual clothing item, in operation 614, the electronic device 201 may automatically select clothing which is best matched to the user based on user information (e.g., user body type) registered in advance, perform the virtual fitting, and display the result on the display.

If the user selects the virtual clothing, the electronic device 201 may determine whether the matching between the clothes is completed (operation 605). In particular, the electronic device 201 may analyze meta information on the clothes selected by the user, and may determine whether or not the matching between the clothes worn by the user is satisfied based on the meta information. In operation 606, the electronic device 201 may determine whether there is a portion that needs to be converted in the image of the user according to the matching result between the clothes selected by the user and the clothes worn by the user. If there is a portion that needs to be converted (i.e., Yes in operation 606), the electronic device 201 performs an image processing function upon the image of the user to convert it into a partial avatar (operation 607). In operation 608, the electronic device 201 may determine whether the clothes to be worn by the user and the image converted into the partial avatar are balanced with each other, and if the balance is satisfactory (i.e., Yes in operation 608), the electronic device 201 may display the image converted into the partial avatar on the display (operation 610).

If it is determined that the clothes to be worn by the user and the image converted into the partial avatar are not balanced with each other in operation 608 (i.e., No in operation 608), the electronic device 201 may receive a recommendation for the clothing which is best matched to the clothes selected by the user via the coordination recommendation module (operation 609), and may display an image of the avatar wearing the above-mentioned recommended clothing on the display.

Figure 7:
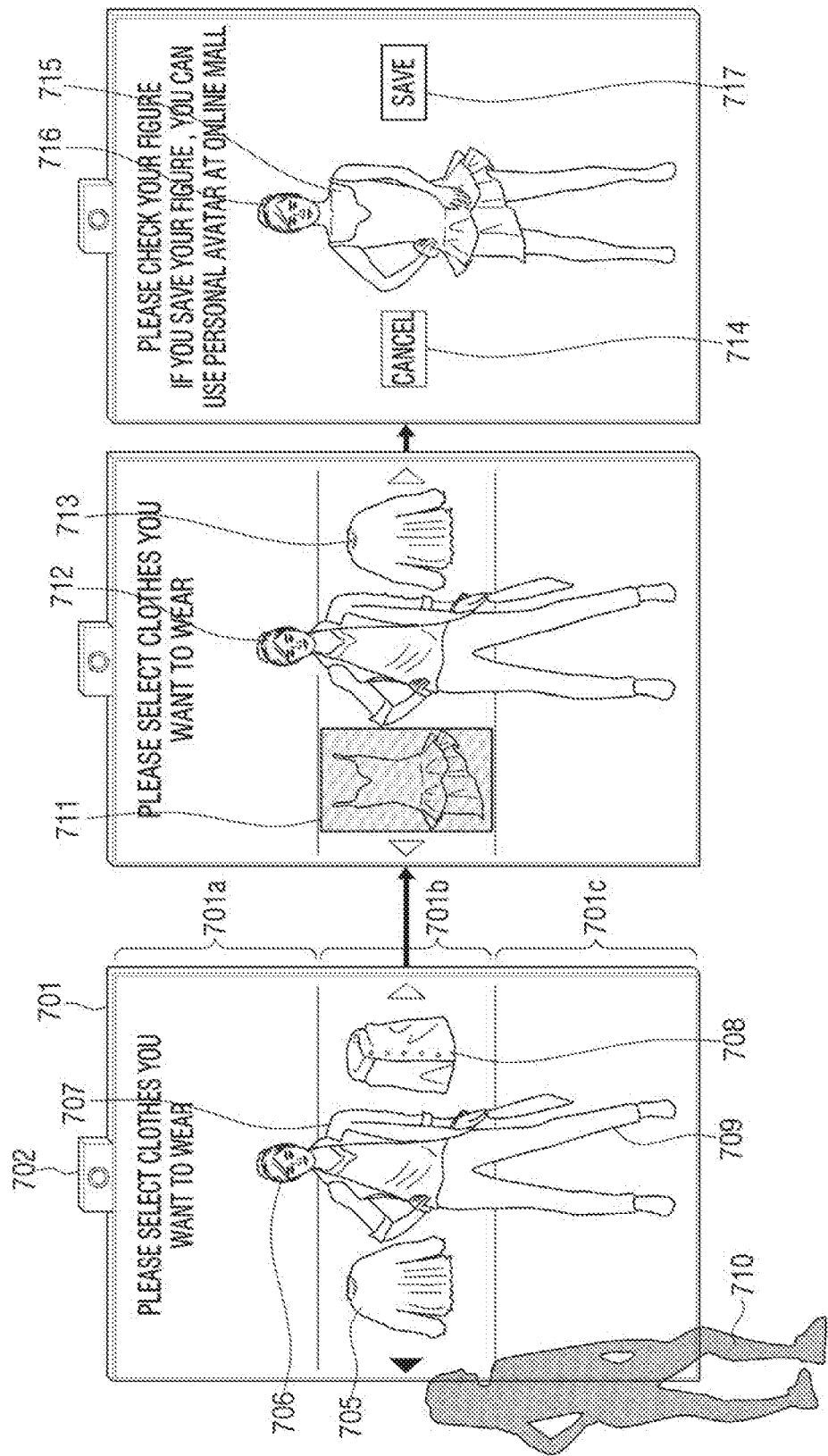
FIG. 7 illustrates a process in which a user selects and fits a virtual clothing.

FIG. 7 illustrates a process in which a user selects and fits a virtual clothing.

Referring to FIG. 7, a display 701 of an electronic device, a camera 702, and a user 710 are illustrated. The electronic device may be, for example, the LFD. The electronic device may include the camera 702. In addition, the camera 702 may be separately provided in a form of an accessory and may be electrically connected to the electronic device.

When the user 710 stands in the front of the electronic device, the camera 702 may photograph the user and generate an image 709 of the user. The image 709 of the user may be displayed on the display 701. In this case, the image 709 of the user may include a face image 706 and an image 707 of the clothes worn by the user, and the user may be recognized based on the face image 706.

The display 701 may include mirror regions 701a and 701c, and an avatar region 7016b. The mirror regions 701a and 701c refer to the regions on which the image of the user photographed by the camera is displayed, and may be interpreted in the same way in the following description. The avatar region 701b may be a region on which the avatar generated based on the body information of the user is displayed. The electronic device may set the avatar region based on the user input. In this aspect, the user input may refer to a hand gesture of the user or the user directly touching a display region. For example, when the user touches an intermediate region 701b, the electronic device may set the intermediate region 701 as the avatar region.

As another example, the electronic device may receive the hand gesture of the user to classify the mirror regions and the avatar region in the display 701. A shape of the hand gesture and an instruction that corresponds to the shape of the hand gesture may be set at the time of manufacturing the electronic device, or may be defined by a user setting. To assist in the user setting, the electronic device may provide a graphical user interface (GUI) associated with the user setting.

If the avatar region 701b is set, a portion of the image of the user that is displayed on the avatar region 701b may be replaced with the avatar or may be converted into the avatar. In addition, the avatar may be displayed in a state in which it wears virtual clothes 705 and 708. In particular, the electronic device may combine the virtual clothes 705 and 708 displayed on the avatar region 701b with the avatar based on the user input and display the composite avatar. For example, if the user takes the hand gesture in the left direction, the avatar may be displayed in a state in which it wears the virtual clothes 708. If the user takes the hand gesture in the right direction, the avatar may be displayed in a state in which it wears the virtual clothes 705.

As another example, if the user selects the virtual clothes 711 by the hand gesture in a state in which the image 712 of the user and the virtual clothes 711 and 712 are displayed on the display 701, the selected virtual clothes 711 may be displayed to be visually separated. Visually separating may be implemented by using highlighting, inversion, and displaying with other colors. The selected virtual clothes 711 may be combined with the image of the user and may be displayed on the display 701. In this aspect, regions that correspond to an arm, a leg, and a neckline from within the image of the user may be converted into the avatar, and the avatar may be displayed in a state in which it wears the selected clothes 711. In addition, a button 714 for canceling a user instruction and a storage button 717 for storing the avatar wearing the virtual clothes 711 may be displayed on the display 701.

Figure 8:
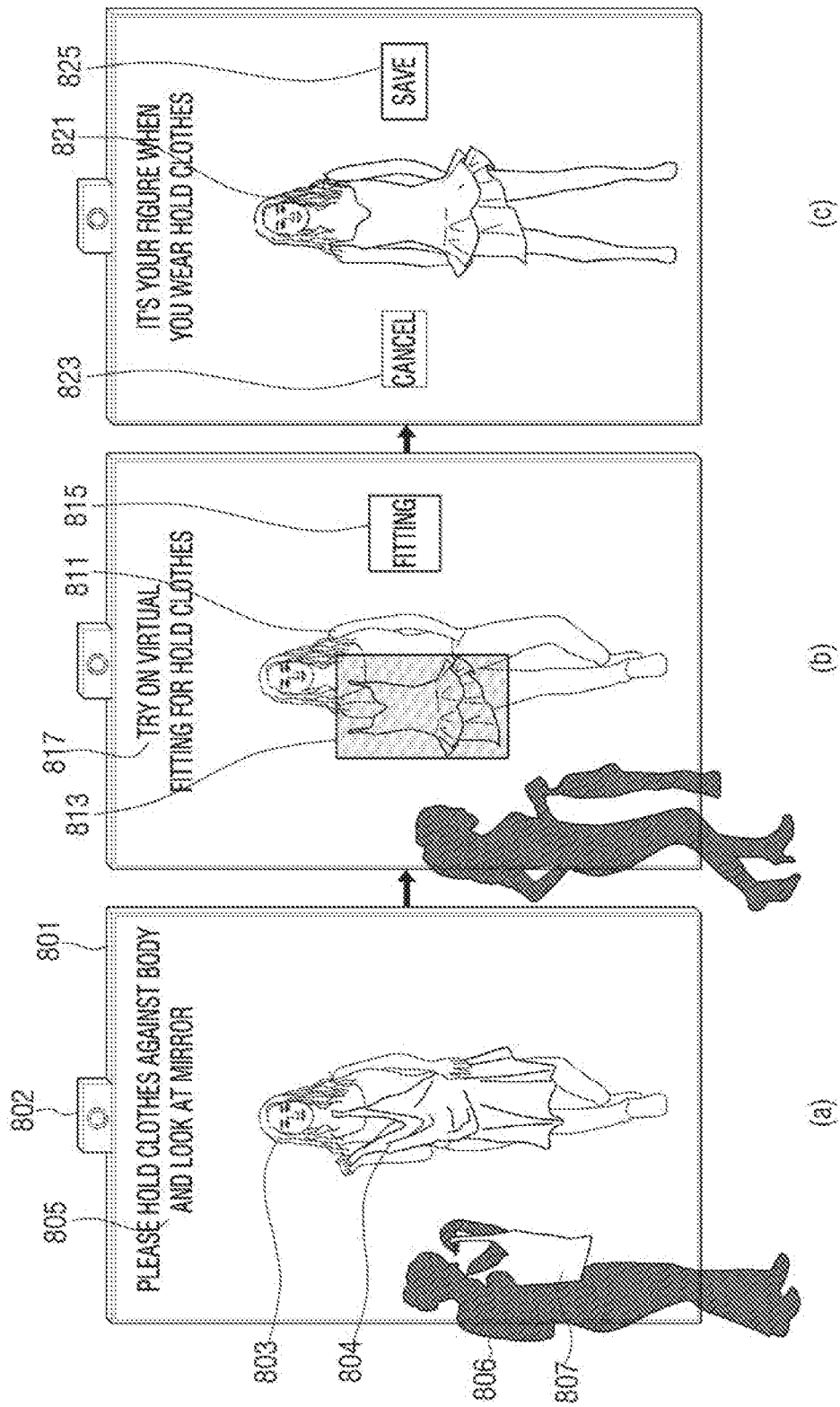
FIG. 8 illustrates an example in which the user holds the clothes being sold against his/her body.

FIG. 8 illustrates an example in which the user holds the clothes being sold against a body.

Referring to drawing (a) on a left side of FIG. 8, a user 806, an image 803 of a user, and an image 804 of clothes selected by the user are illustrated. In general, when the user 806 purchases the clothes in an offline store, the user 806 stands in the front of the mirror and holds the clothes to be purchased against a body. The electronic device may simulate the above-mentioned situation, and photograph the user by using the camera 802 when the user stands in the front of the electronic device in a state in which user holds the clothes against the body to generate an image of the user of a state in which an image to be purchased is held against the body.

The user 806 and the clothes 807 selected by the user may be displayed on the display 801 of the electronic device via the camera 802. The display 801 of the electronic device may display the image 803 of the user and the image 804 of the clothes selected by the user. The image 804 of the clothes selected by the user may be an image obtained by photographing actual clothes 807 by the camera rather than an image of the virtual clothes.

For example, if the user 806 stands in the front of the electronic device in a state in which the user holds the clothes 807 selected in the store against the body, the camera 802 may photograph the user 806 and the clothes 807 selected by the user in order to generate the image of the user. The display 801 may display an image 803 of the user of a state in which the user holds the selected clothes 804 against the body. In addition, the display 801 may display a guidance phrase 805 that instructs the user to perform an action. For example, the electronic device may display the phrase "please hold clothes against body and look at mirror" on the display 801. The electronic device may identify the user 803 and the clothes 804 selected by the user from the image displayed on the display 801, and may retrieve the virtual clothes that correspond to the identified clothes 804 selected by the user. In particular, the electronic device may retrieve an image that corresponds to the clothes selected by the user from the server based on the identified clothes selected by the user. If the clothes 804 selected by the user are identified, the electronic device may transmit information on the clothes 804 selected by the user to the server via the communicator, and the server may retrieve the virtual clothes that correspond to the clothes 804 selected by the user. The server may transmit the retrieved virtual clothes to the electronic device, and the electronic device may display the virtual clothes on the display 801.

Referring to drawing (b) in a center portion of FIG. 8, an image 811 of a user, a virtual clothes 813 that correspond to the clothes selected by the user, and a user input button 815 are illustrated. The electronic device may display the retrieved virtual clothes 813 to be overlapped with the image 811 of the user. The virtual clothes 813 may be displayed to be visually separated. The electronic device may display a button 815 for receiving a user instruction on the display 801. The electronic device may display a message 817 on the display 801 to guide an action of the user. For example, the electronic device may display the phrase "try on virtual fitting for held clothes" on the display 801 If the user selects the button 815 by performing a hand gesture or a touch input, the electronic device may combine the image 811 of the user with the virtual clothes 813 and display the composite image. In particular, a partial region of the image of the user may be changed to an avatar wearing the virtual clothes 813 and displayed.

Referring to drawing (c) on a right side of FIG. 8, an avatar 821 wearing the virtual clothes, and user input buttons 823 and 825 are illustrated. The avatar 821 may be generated based on the image 811 of the user, and may be combined with an actual image of the user and displayed on the display. When the avatar which was previously generated is stored in the server, the electronic device does not separately generate the avatar, and may display the avatar stored in the server in a state in which the avatar wears the virtual clothes that correspond to the clothes 807 selected by the user. The user may store the image of the state wearing the virtual clothing in the electronic device or the server by selecting the store button 825. Alternatively, the user may perform a change to another virtual clothing item by pressing a cancel button 823.

Figure 9:
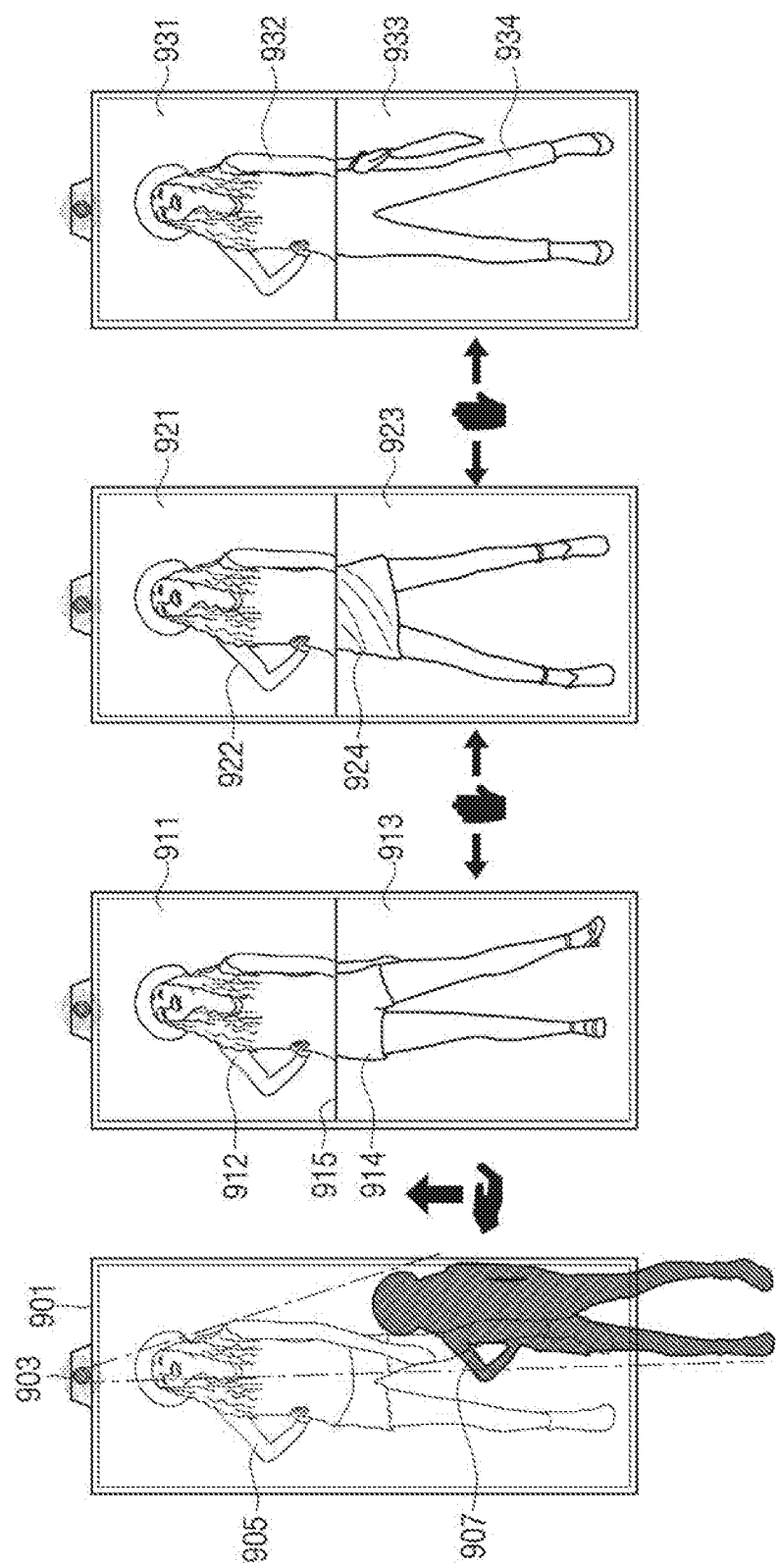
FIG. 9 illustrates an example in which a display is divided into a mirror region and an avatar region based on a user input.

FIG. 9 illustrates an example in which a display is divided into a mirror region and an avatar region based on a user input.

Referring to FIG. 9, a display 901 of an electronic device and a camera 903 are illustrated. When a user 907 stands in a range of the electronic device, the camera 903 may photograph the user, and an image 905 of the user photographed by the camera 903 may be displayed on the display 901. The electronic device may display a control bar 915 on the display based on the user input, and may set an avatar region based on the user input which is input with respect to the control bar 915. The control bar 915 may be a boundary line between a mirror region 911 and the avatar region 913, and may be moved in up, down, left, and right directions according to a hand gesture of the user.

For example, if the user performs a gesture of lifting the hand, the control bar 915 may be displayed on the display 901. If the user raises the hand, the control bar may be upwardly moved, and if the user lowers the hand, the control bar may be downwardly moved. The display 901 may be classified into the mirror region 911 and the avatar region 913 by the control bar.

The electronic device may set the mirror region 911 and the avatar region 913 based on the user input. For example, user input buttons may be displayed on the mirror region 911 and the avatar region 913, and if the user selects one of the buttons displayed on the mirror region 911 and the avatar region 913, the selected region may be set as the avatar region 913. Alternatively, it is also possible to set the opposite, according to an exemplary embodiment.

A portion 912 of the image of the user may be displayed on the mirror region 911. For example, an upper body image of the user may be displayed on the mirror region 911. An avatar 914 wearing the virtual clothes may be displayed on the avatar region 913. The virtual clothes may be the clothes selected by the user or the clothes recommended from the server. If the user input is received in a state in which the avatar is displayed on the avatar region 913 of the display 901, the electronic device may change the virtual clothes worn by the avatar 914 based on the user input. For example, as the user moves his/her hand in a left direction or a right direction, an avatar 924 wearing another item of clothing may be displayed on an avatar region 923. In this state, as the user continues to move his/her hand in the left direction or the right direction, an avatar 934 wearing another item of clothing may be displayed on an avatar region 933.

The electronic device may control a size of the avatar based on a user body type measured by the camera 903. In addition, the electronic device may analyze an image within a close proximity of the control bar in order to extract a boundary line of the clothes worn by the user from the portion of the image of the user and to combine the avatar with the image of the user based on a position of the boundary line. For example, if a position of the control bar is at a portion between the top and the bottom of the user, the electronic device may extract the boundary line of the top portion of the user and may compose the avatar based on the position of the boundary line.

Figure 10:
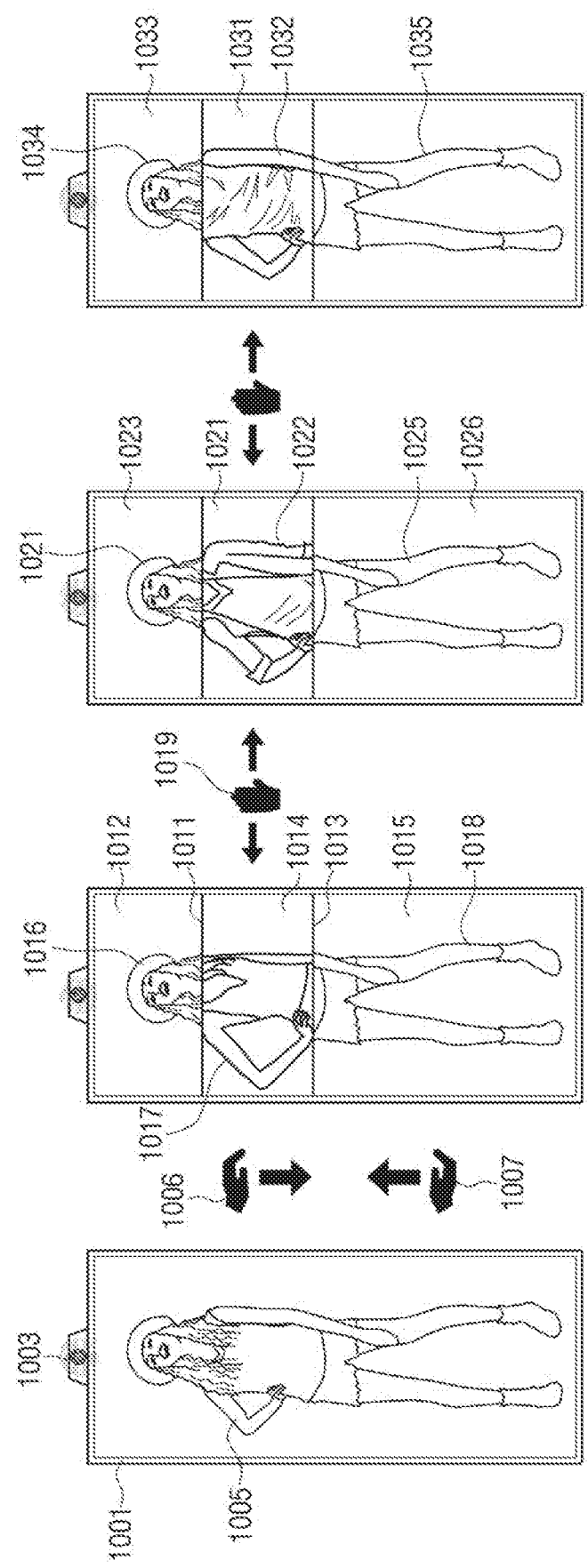
FIG. 10 illustrates an example in which an intermediate region of the display is set as the avatar region according to the user input.

FIG. 10 illustrates an example in which an intermediate region of the display is set as the avatar region according to the user input. In particular, FIG. 10 illustrates an example in which the display is divided into a first mirror region, an avatar region, and a second mirror region.

Referring to FIG. 10, a display 1001 of an electronic device and a camera 1003 are illustrated. If the electronic device receives a plurality of hand gestures in a state in which an image of the user is displayed on the display 1001, the electronic device may set the region in which the plurality of hand gestures are recognized as the avatar region. For example, if the user performs a hand gesture with a left hand 1006 and a right hand 1007 in a state in which the image of the user is displayed on the display 1001, the electronic device may display two control bars 1011 and 1013 on the display 1001, and may set a region between the control bar 1011 and the control bar 1013 as an avatar region 1014. A first portion 1016 of the image of the user may be displayed on an upper end region of the control bar 1011, and a second portion 1018 of the image of the user may be displayed on a lower end region of the control bar 1013. The first portion 1016 may be, for example, an image of a face portion of the user. The second portion 1018 may be, for example, an image of a leg portion of the user.

If the user input is received in a state in which an avatar 1017 is displayed on the display 1001, the electronic device may change and display the clothes worn by the avatar based on the user input. For example, if the user moves his/her hand in the left direction in a state in which the avatar 1017 is displayed on the display, an avatar 1022 wearing another virtual item of clothing may be displayed on an avatar region 1021. In addition, if the user moves his/her hand in the left direction in a state in which an avatar 1022 is displayed on the display, an avatar 1032 wearing another virtual item of clothing may be displayed on an avatar region 1031.

Figure 11:
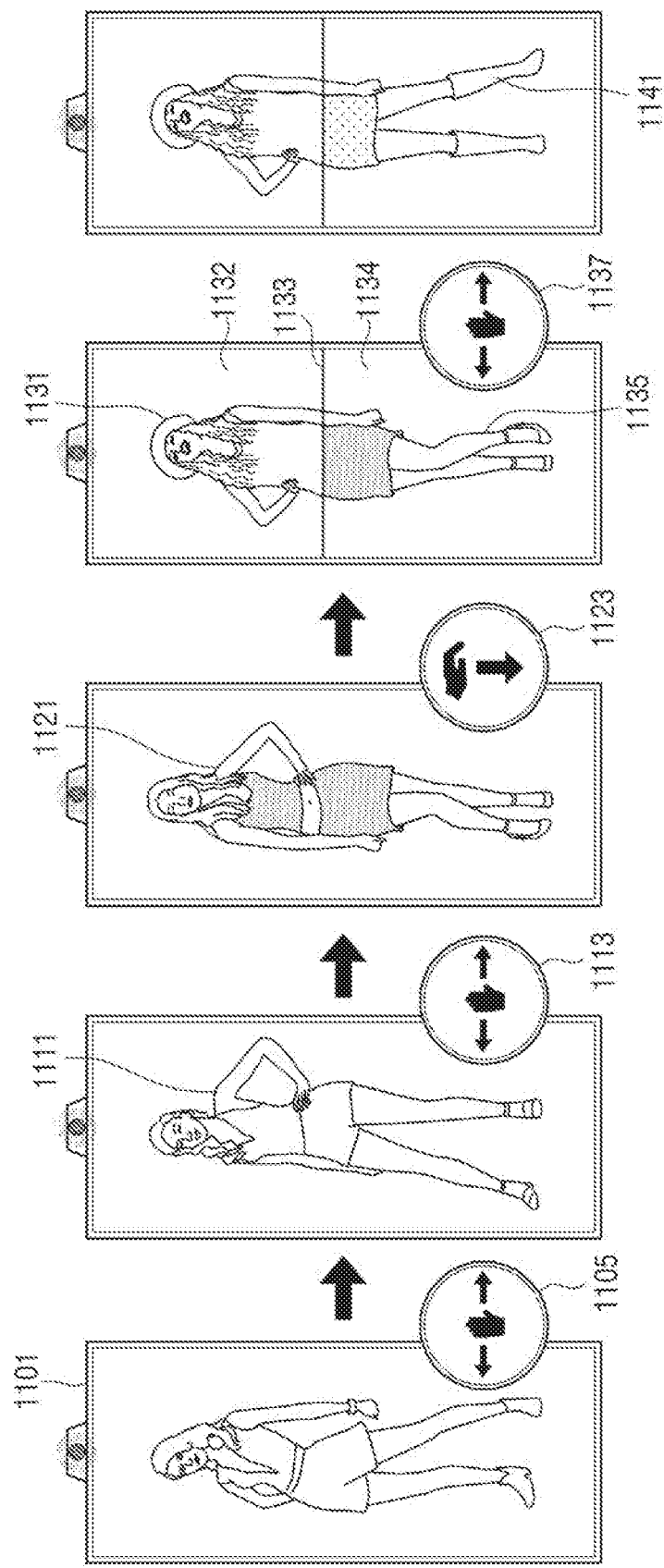
FIG. 11 illustrates another exemplary embodiment.

FIG. 11 illustrates another exemplary embodiment of the present disclosure.

Referring to FIG. 11, an avatar is displayed on an entirety of a display 1101 of an electronic device. In a state in which the entirety of the display 1101 is set as an avatar region, the electronic device may change and display the virtual clothes worn by the avatar based on the user input. For example, if the user moves a hand 1105 in the left direction or the right direction in a state in which an avatar 1103 is displayed on the display, an avatar 1111 wearing another virtual item of clothing may be displayed on the display 1101. In this state, if the user moves a hand 1113 in the left direction or the right direction, an avatar 1121 wearing still another virtual item of clothing may be displayed on the display 1101.

In a state in which the entirety of the display 1101 is set as an avatar region, the electronic device may set some regions of the display 1101 as the mirror region based on the user input. A portion of the image of the user may be displayed on the mirror region. For example, if the user downwardly moves the hand in a state in which the avatar 1121 is displayed on the entirety of the display 1101, a control bar 1133 may be displayed on a screen. The control bar 1133 may be moved to an upper end of the display 1101 or a lower end of the display 1101 based on the user input.

If the user moves the hand in the upper end direction, the control bar 1133 may be moved in an upper end direction of the screen. If the user moves the hand in the lower end direction, the control bar 1133 may be moved in a lower end direction of the screen. If the user selects any one region in a state in which the display 1101 is classified into two regions by the control bar 1133, the selected region may be set as the mirror region. If the user receives an instruction that selects the region in a state in which the control bar 1133 is displayed on the display 1101, the electronic device may set the selected region as the mirror region. A portion of the image of the user photographed by the camera may be displayed on the mirror region. For example, if the user directs the back of the hand to the sky to be stopped for a predetermined time at the intermediate portion of the display 1101 in a state in which the entirety of the display 1101 is set as the avatar region, the control bar 1133 may be displayed on the intermediate portion of the display. In this state, if the user performs a motion of clenching a fist in an upper end region portion in order to select an upper end region of the control bar, the upper end region portion may be set as the mirror region 1132, and an upper end portion 1131 of the image of the user photographed by the camera may be displayed. In addition, a lower end region portion may be set as the avatar region 1134, and an avatar 1135 may be displayed on a lower end portion. An instruction that the user selects a specific region of the display 1101 may be performed when the electronic device recognizes a specific gesture. The instruction identified by the electronic device based on the gesture may be determined by the user or may be set in advance by the electronic device. For example, if the user moves the hand in a horizontal direction in state in which a palm is directed in the horizontal direction, the clothes worn by an avatar 1141 may be changed.

According to still another exemplary embodiment, if the user maintains the palm for a predetermined amount of time in a state in which the palm is directed in an upper end direction or a lower end direction, the control bar 1133 may be displayed on the display 1101. In this state, if the user moves the hand in a vertical direction, the control bar 1133 may be moved in the upper end or lower end direction of the display. If the user maintains, for a predetermined amount of time, a state in which the user clenches the fist in the specific region of the display or the palm is directed to the display, the corresponding region may be selected.

The region selected by the user may be set as the mirror region or the avatar region by a toggle operation. For example, if the user performs an operation of selecting the upper end region in a state in which the upper end region of the display 1101 is set as the avatar region, the upper end region may be changed to the mirror region. In this state, if the user again takes an operation of selecting the upper end region, the upper end region may be changed to the avatar region. In this manner, the region selected by the user may be continuously changed in order of the avatar region, the mirror region, the avatar region, and the mirror region based on the selection of the user.

If the upper end portion of the control bar 1133 on the basis of the control bar 1133 displayed on the display 1101 is set as the mirror region 1132, and the lower end portion thereof is set as the avatar region 1134, the image of the user may be displayed on the mirror region, and the avatar may be displayed on the avatar region. The image of the user and the avatar may be displayed naturally as one image by performing image processing with respect to a boundary portion therebetween.

In this state, if the user moves a hand 1137 in the left direction or the right direction, an avatar 1141 wearing another virtual item of clothing may be displayed on the avatar region. In this aspect, the clothes worn by the avatar 1141 may be changed and displayed by the hand operation of the user.

Figure 12:
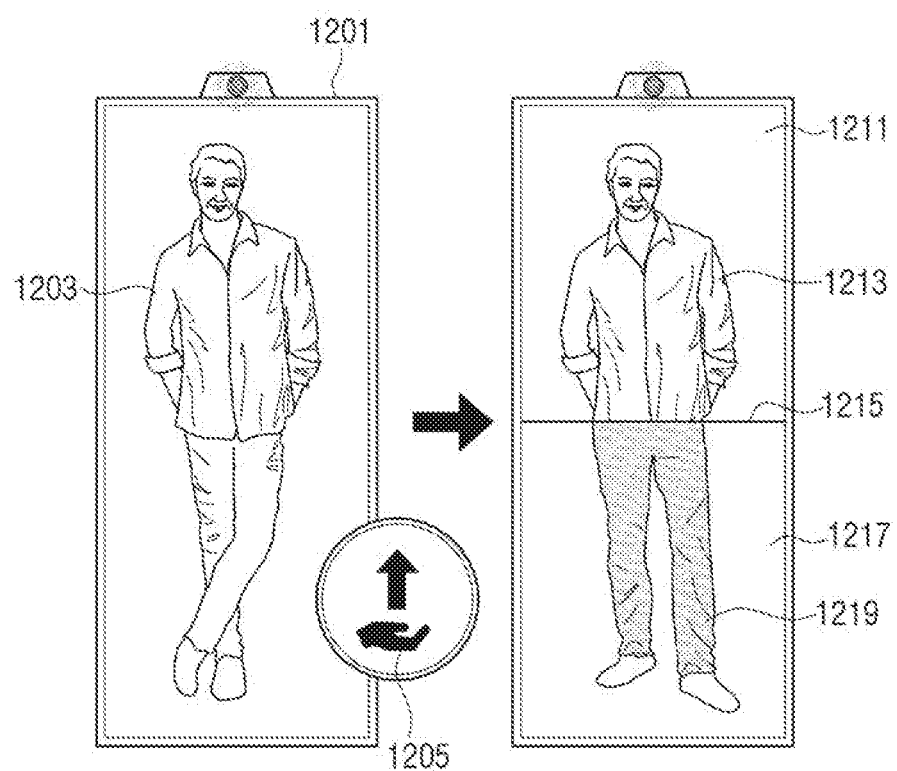
FIG. 12 illustrates an example of providing a fitting service in an electronic device, according to another exemplary embodiment.

FIG. 12 illustrates an example of providing a fitting service in an electronic device, according to another exemplary embodiment.

If the user stands in the front of the electronic device in a state in which the user wears the top selected in the store, a camera may photograph the user in order to generate an image of the user, and the electronic device may display an image 1203 of the user on a display 1201. The electronic device may receive a user input in a state in which the image 1203 of the user is displayed on the display 1201, may display a control bar 1215 on the display 1201 based on the user input 1205, and may set a mirror region and an avatar region based on the control bar 1215. The setting of the mirror region and the avatar region may be determined according to the user input. For example, if the user selects a button on a lower end region in a state in which a phrase "select a region that you want to be selected as an avatar region" is displayed on the display, the lower end region may be set as the avatar region.

If the display 1201 receives the user input in a state in which an image 1213 of the user is displayed on the mirror region 1211 and an avatar 1219 is displayed on the avatar region 1217, the electronic device may change the virtual clothes worn by the avatar 1219 to another virtual item of clothing based on the user input. For example, if the user performs an operation of moving the hand in the left or right direction, the electronic device may change pants worn by the avatar 1219 to pants of different color or different design, based on the movement of the hand.

Although the electronic device according to diverse exemplary embodiments of the present disclosure has been described above with reference to the limited exemplary embodiments and the drawings, the electronic device according to the diverse exemplary embodiments is not limited to the above-described exemplary embodiments, and various changes and modifications thereof may be made by persons having ordinary skill in the art.

Therefore, the exemplary embodiments are presented for the purpose of explanation and understanding of the disclosed contents, and do not limit the scope of the technology disclosed in the present disclosure. Accordingly, the scope of the present disclosure should be interpreted to include all modifications or various other exemplary embodiments based on the technical spirit of the present disclosure.

What is claimed is:

1. A method for composing an image by using an electronic device, the method comprising:
   displaying an image of a user photographed by a camera;
   setting a mirror region and an avatar region with respect to the image of the user based on a user input for controlling a boundary between the mirror region and the avatar region;
   generating an avatar to be displayed on the avatar region;
   receiving a selection of virtual clothes to be displayed on the avatar region;
   obtaining coordination information on the selected virtual clothes, the coordination information including category information and color information;
   identifying at least one of items of virtual clothing matching the selected virtual clothes based on the category information and the color information included in the obtained coordination information on the selected virtual clothes;

combining the avatar with the selected virtual clothes and the identified at least one of the items of virtual clothing;

obtaining a resulting composite image by combining the combined avatar at a first portion of the body of the user with a portion of the image of the user at a second portion of the body of the user; and displaying the resulting composite image, wherein the combined avatar is displayed in the avatar region and the portion of the image of the user is displayed in the mirror region.

2. The method of claim 1, further comprising:

determining whether a real clothing item currently being worn by the user is different from the identified at least one of the items of virtual clothing, based on the real clothing item currently being worn by the user being different from the identified at least one of the items of virtual clothing, changing the real clothing item to the identified at least one of the items of virtual clothing and displaying the identified at least one of the items of virtual clothing.

3. The method of claim 1, further comprising:

obtaining information that relates to at least one first item of clothing worn by the user in the avatar region; and obtaining at least one second item of clothing to be worn by the avatar from a server based on the obtained information that relates to the at least one first item of clothing.

4. The method of claim 3, wherein the information that relates to the at least one first item of clothing includes category information and color information that relates to the at least one first item of clothing.

5. The method of claim 1, wherein the generating the avatar comprises extracting body information that relates to the user from the image of the user and generating an avatar that corresponds to the user based on the extracted body information.

6. The method of claim 5, wherein the avatar has a shape that varies based on a motion of the user.

7. The method of claim 5, wherein the extracted body information that relates to the user includes a skin color of the user adjacent to the avatar region, and wherein the generating the avatar comprises generating the avatar based on the skin color of the user.

8. The method of claim 1, further comprising changing an image of at least one first item of clothing to be worn by the avatar based on the user input.

9. The method of claim 8, further comprising determining the image of the at least one first item of clothing to be worn by the avatar based on the user input, wherein the displaying of the resulting composite image comprises combining the determined image of the avatar wearing the at least one first item of clothing with the image of the user and displaying the resulting composite image on a display.

10. The method of claim 9, further comprising:

obtaining coordination information that relates to the at least one first item of clothing based on the determined at least one first item of clothing; and determining at least one second item of clothing that corresponds to the determined first at least one item of clothing based on the obtained coordination information, wherein the displaying of the resulting composite image comprises combining an avatar wearing the at least one second item of clothing with the image of the user and displaying the resulting composite image on the display.

11. The method of claim 10, wherein the at least one second item of clothing includes at least one from among clothes, shoes, and accessories.

12. An electronic device comprising:

a display configured to display an image of a user photographed by a camera;

an input component configured to receive a user input;

a communicator configured to facilitate a communication with an external server; and a processor configured to:

display the image of the user on the display, set a mirror region and an avatar region with respect to the image of the user based on the received user input for controlling a boundary between the mirror region and the avatar region, generate an avatar to be displayed on the avatar region, receive a selection of virtual clothes to be displayed on the avatar region, obtain coordination information on the selected virtual clothes, the coordination information including category information and color information, identify at least one of items of virtual clothing matching the selected virtual clothes based on the category information and the color information included in the obtained coordination information on the selected virtual clothes, combine the avatar with the selected virtual clothes and the identified at least one of the items of the virtual clothing, obtain a resulting composite image by combining the combined avatar at a first portion of the body of the user with a portion of the image of the user at a second portion of the body of the user, and control the display to display the resulting composite image, wherein the combined avatar is displayed in the avatar region and the portion of the image of the user is displayed in the mirror region.

13. The electronic device of claim 12, wherein the processor is further configured to determine whether a real clothing item currently being worn by the user is different from the identified at least one of the items the virtual clothing, based on the real clothing item currently being worn by the user being different from the identified at least one of the items the virtual clothing, change the real clothing item to the identified at least one of the items of the virtual clothing and control the display to display the identified at least one of the items the virtual clothing.

14. The electronic device of claim 12, wherein the processor is further configured to obtain information that relates to at least one first item of clothing worn by the user in the avatar region, and obtain at least one second item of clothing to be worn by the avatar from the external server based on the obtained information that relates to the at least one first item of clothing.

15. The electronic device of claim 14, wherein the information that relates to the at least one first item of clothing includes category information and color information that relates to the at least one first item of clothing.

16. The electronic device of claim 12, wherein the processor is further configured to extract body information that relates to the user from the image of the user, and generate an avatar that corresponds to the user based on the extracted body information.

17. The electronic device of claim 16, wherein the avatar has a shape that varies based on a motion of the user.

18. The electronic device of claim 16, wherein the extracted body information that relates to the user includes a skin color of the user adjacent to the avatar region, and
wherein the processor is further configured to generate the avatar based on the skin color.

19. The electronic device of claim 12, wherein the processor is further configured to control the display to change at least one first item of clothing to be worn by the avatar based on the user input.

20. The electronic device of claim 19, wherein the processor is further configured to determine the at least one first item of clothing to be worn by the avatar based on the user input, and control the display to combine the avatar wearing the at least one first item of clothing with the image of the user and to display the resulting composite image.

* * * * *